(12) United States Patent
Kim (10) Patent No.: US 12,012,032 B2
(45) Date of Patent: Jun. 18, 2024

(54) LAMP AND DISPLAY DEVICE

(71) Applicant: HYUNDAI MOBIS CO., LTD., Seoul (KR)

(72) Inventor: Myeong Je Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 70 days.

(21) Appl. No.: 17/545,872

(22) Filed: Dec. 8, 2021

(65) Prior Publication Data
US 2023/0055879 A1 Feb. 23, 2023

(30) Foreign Application Priority Data

Aug. 23, 2021 (KR) .......................... 10-2021-0110816

(51) Int. Cl.
| | | |
|---|---|---|
| *B60Q 1/04* | (2006.01) | |
| *F21S 41/30* | (2018.01) | |
| *F21S 41/36* | (2018.01) | |
| *F21S 41/675* | (2018.01) | |
| *G02B 26/08* | (2006.01) | |

(52) U.S. Cl.
CPC ............. *B60Q 1/04* (2013.01); *F21S 41/675* (2018.01); *F21S 41/30* (2018.01); *F21S 41/36* (2018.01); *G02B 26/0833* (2013.01); *G02B 26/0841* (2013.01); *G02B 26/085* (2013.01); *G02B 26/0858* (2013.01); *G02B 26/0866* (2013.01)

(58) Field of Classification Search
CPC ............ G02B 26/0833; G02B 26/0841; G02B 26/085; G02B 26/0858; G02B 26/0866; F21S 41/675; F21S 41/30; F21S 41/36
See application file for complete search history.

(56) References Cited

U.S. PATENT DOCUMENTS

| | | | |
|---|---|---|---|
| 10,654,401 B2 | 5/2020 | Hamada et al. | |
| 2002/0085437 A1* | 7/2002 | Huffman | G11C 13/04 |
| | | | 365/200 |
| 2007/0019432 A1 | 1/2007 | Shimada | |
| 2009/0161080 A1* | 6/2009 | Liu | H04N 5/7458 |
| | | | 359/290 |
| 2019/0031087 A1* | 1/2019 | Kim | B60Q 1/143 |
| 2019/0116345 A1* | 4/2019 | Albou | F21S 41/675 |
| 2020/0072701 A1* | 3/2020 | Svrcek | B60Q 1/1423 |

FOREIGN PATENT DOCUMENTS

| | | | |
|---|---|---|---|
| DE | 10-2015-012020 | 3/2017 | |
| DE | 102016122499 | 5/2018 | |
| DE | 102018101686 | 1/2019 | |
| DE | 102018211977 | 1/2019 | |
| DE | 102017223441 A1 * | 6/2019 | ............... B60Q 1/08 |
| JP | H10104753 A * | 4/1998 | |

(Continued)

OTHER PUBLICATIONS

Machine translation of JP H10104753 A retrieved from the FIT database of PE2E search. (Year: 2023).*

(Continued)

*Primary Examiner* — Colin J Cattanach (74) *Attorney, Agent, or Firm* — DLA Piper LLP (US)

(57) ABSTRACT

A lamp may include a display device including a first region and a second region having mutually different references for the number of a failed pixel, and a controller to control the display device.

18 Claims, 8 Drawing Sheets

(56) References Cited

FOREIGN PATENT DOCUMENTS

| | | |
|---|---|---|
| JP | 2008-207738 | 9/2008 |
| JP | 2013-237427 | 11/2013 |
| KR | 2007-0054736 | 5/2007 |
| KR | 2017-0129071 | 11/2017 |
| KR | 2019-0041940 | 4/2019 |
| KR | 10-2184132 | 11/2020 |
| KR | 2021-0083015 | 7/2021 |

OTHER PUBLICATIONS

Machine translation of DE 102017223441 A1 retrieved from the FIT database of PE2E search. (Year: 2024).*
German Office Action dated Jun. 29, 2022 issued in DE 10-2022-107065.4.
English Language Abstract of DE 10-2015-012020 published May 24, 2018.
English Language Abstract of JP 2013-237427 published Nov. 28, 2013.
Korean Office Action dated Jan. 17, 2023 issued in KR Application No. 10- 2021-0110816.
English Language Abstract of KR 2007-0054736 published May 29, 2007.
English Language Abstract of KR 2019-0041940 published Apr. 23, 2019.
English Language Abstract of JP 2008-207738 published Sep. 11, 2008.
German Office Action dated May 5, 2022 issued in DE Application No. 102021132638.9.
English Language Abstract of DE 102016122499 published May 24, 2018.
English Language Abstract of DE 102018101686 published Jan. 24, 2019.
English Language Abstract of DE 102018211977 published Jan. 31, 2019.
Korean Office Action dated May 30, 2023 issued in KR Application No. 10-2021- 0163543.
English Language Abstract of KR 10-2184132 published Nov. 27, 2020.
English Language Abstract of KR 2021-0083015 published Jul. 6, 2021.
English Language Abstract of KR 2017-0129071 published Nov. 24, 2017.

* cited by examiner

LAMP AND DISPLAY DEVICE

CROSS-REFERENCE TO RELATED APPLICATION

This application claims the benefit of priority to Korean Patent Application No. 10-2021-0110816, filed in the Korean Intellectual Property Office on Aug. 23, 2021, the entire contents of which are incorporated herein by reference.

TECHNICAL FIELD

The present disclosure relates to a lamp and a display device.

BACKGROUND

In general, a head lamp of a vehicle is used to ensure a stable front visual field at night or in a tunnel, a fog situation, or a rain situation, in which a surrounding environment is dark.

Recently, as a digital mirror device (DMD) is extensively used, the DMD has been employed even for the head lamp of the vehicle. The head lamp employing the DMD may perform a high-resolution advanced driving beam (ADB) function. The ADB function is to prevent a counterpart driver from being dazzled, when a vehicle is appeared in front of a host vehicle or on an opposite road, and when the head lamp is operating in a high beam state. To perform the ADB function, there is necessary a head lamp allow a driver to ensure a visual field without being dazzled.

When a partial region of the DMD, which is turned on, is failed in operation, a shadow area may not be formed. Accordingly, light may be reflected from the partial region, which is turned on, and output, such that the counterpart driver is dazzled. In other words, there is necessary a method for preventing a driver from being dazzled due to a failed pixel of the DMD.

SUMMARY

The present disclosure has been made to solve the above-mentioned problems occurring in the prior art while advantages achieved by the prior art are maintained intact.

An aspect of the present disclosure provides a display device having mutually different references for the number of a failed pixel, depending on regions.

An aspect of the present disclosure provides a display device having mutually different references for the number of a failed pixel, depending on regions and a lamp capable of controlling a display device based on whether the display device is rotated.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp may include a display device including a first region and a second region having mutually different references for the number of a failed pixel and a controller to control the display device.

According to an embodiment, the number of a pixel having bright failure may be allowed up to a first set number and the number of a pixel having a dark failure may be allowed up to a second set number, in the first region. The pixel having the bright failure may not be allowed in the second region, and the number of the pixel having the dark failure may be allowed up to a third set number in the second region.

According to an embodiment, the first set number may be six, the second set number may be six, and the third set number may be four.

According to an embodiment, the first region may be an upper half region of the display device, and the second region may be a lower half region of the display device.

According to an embodiment, when the pixel having the bright failure is absent in the first region, but present in the second region, the display device may be rotated at 180° and mounted.

According to an embodiment, the controller may determine whether the display device is rotated, and may control the display device based on whether the display device is rotated.

According to an embodiment, the controller may re-set coordinates of a pixel included in the display device, when determining the display device as being rotated.

According to an embodiment, the controller may control the display device to invert black and white of the pixel data of the display device and to output the pixel data, when determining the display device as being rotated.

According to an embodiment, the controller may control the second region to be used to perform an adaptive driving beam (ADB) function, when determining the display device as not being rotated, and control the first region to be used to perform the ADB function, when determining the display device as being rotated.

According to an embodiment, the first region may be used to perform at least one of a low beam function or a function of displaying information on a road surface. The second region may be used to perform an ADB function, and a pixel having bright failure is not allowed in the second region.

According to another aspect of the present disclosure, a display device may include a first region in which the number of a pixel having bright failure is allowed up to a first set number, and the number of a pixel having dark failure is allowed up to a second set number, and a second region in which the pixel having the bright failure is not allowed and the number of the pixel having the dark failure is allowed up to a third set number.

According to an embodiment, the first region may be an upper half region of the display device, and the second region may be a lower half region of the display device.

According to an embodiment, the second region may be used to perform an ADB function, and the first region may be used to perform at least one of a low beam function or a function of displaying information on a road surface.

According to an embodiment, the first set number may be six, the second set number may be six, and the third set number may be four.

According to an embodiment, when the pixel having the bright failure is absent in the first region, but present in the second region, the first region may be used to perform an ADB function, and the second region may be used to perform at least one of the low beam function or the function of displaying information on the road surface.

According to an embodiment, the display device may be rotated at 180° and used.

According to an embodiment, coordinates of each pixel may be re-set.

According to an embodiment, data of each pixel may be inverted in black and white and output.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
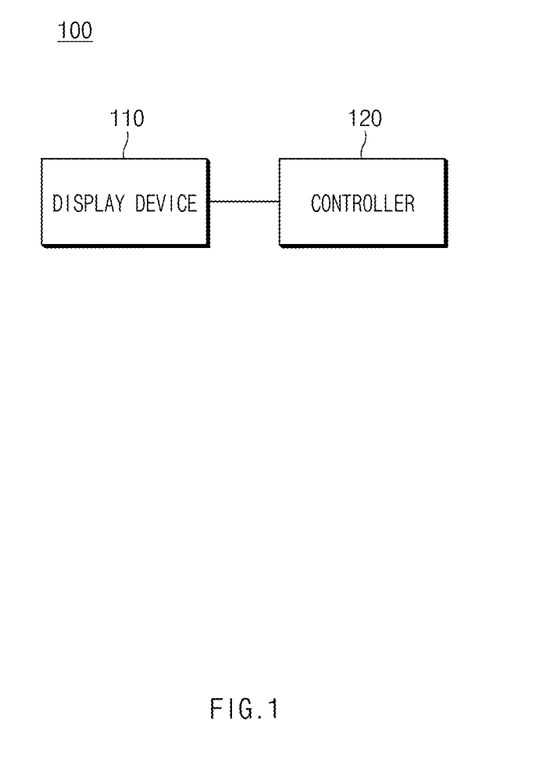
FIG. 1 is a block diagram illustrating a lamp, according to an embodiment of the present disclosure.

FIG. 1 is a block diagram illustrating a lamp, according to an embodiment of the present disclosure.

Referring to FIG. 1, according to an embodiment of the present disclosure, a lamp 100 may include a display device 110 and a controller 120.

The display device 110 may include a first region and a second region having mutually different references for the number of a failed pixel. For example, the first region may be an upper half region of the display device 110, and the second region may be a lower half region of the display device 110. However, the present disclosure is not limited thereto. According to an embodiment, the display device 110 may include a plurality of pixels to output data. According to an embodiment, the display device 110 may include a digital mirror device (DMD).

The controller 120 may control the display device 110. For example, the controller 120 may control a plurality of pixels included in the display device 110. For another example, the controller 120 may control the display device 110 to display a specific image, and may control the plurality of pixels, which are included in the display device 110, to output mutually different data. For another example, the controller 120 may control an angle of each of pixels included in the DMD to control each of the pixels to output bright data or dark data. The bright data may refer to that light is output from the DMD, and the dark data may refer to that light is not output from the DMD. For another example, the controller 120 may control at least one of an angle, a position, a direction, a range, luminance, illuminance, a color, a time, information, an image, and a height for the output of the display device 110.

Figure 2:
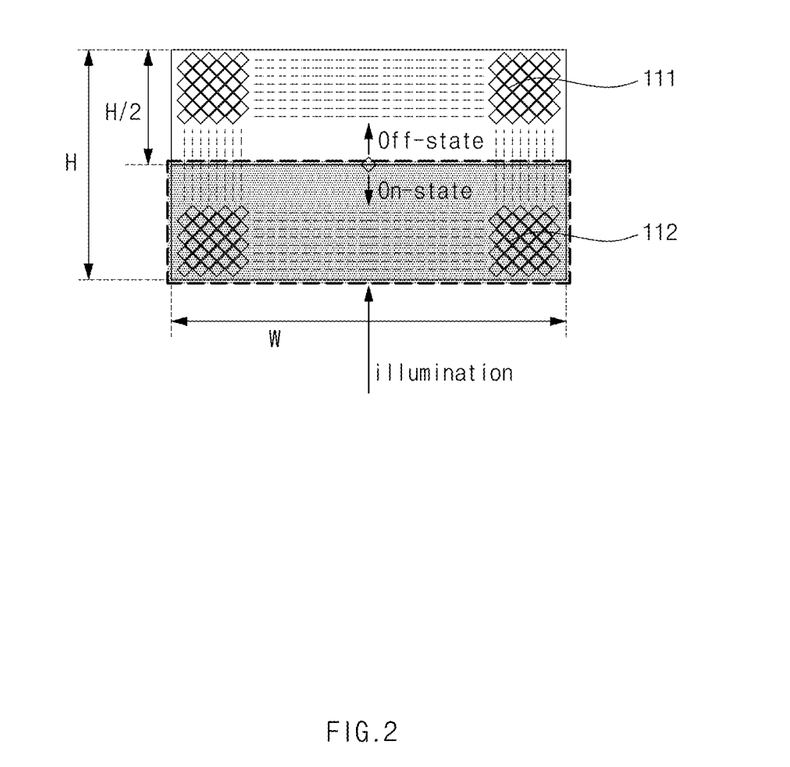
FIG. 2 is a view illustrating a display device, according to an embodiment of the present disclosure.

FIG. 2 is a view illustrating a display device, according to an embodiment of the present disclosure.

Referring to FIG. 2, according to an embodiment of the present disclosure, the display device 110 may include a first region 111 and a second region 112. For example, the first region 111 may be an upper half region of the display device 110, and the second region 112 may be a lower half region of the display device 110.

The display device 110 may include a plurality of pixels. For example, each of the plurality of pixels included in the display device 110 may be controlled by the controller 120. The first region 111 may include pixels in the upper half region of the display device 110, and the second region 112 may include pixels in the lower half region of the display device 110. For example, when the display device 110 includes the total of W×H number of pixels, as the display device 110 includes "W" number of pixels lengthwise, and includes "H" number of pixels widthwise, the first region 111 may include W×(H/2) number of pixels positioned at the upper half region in the display device 110 and the second region 112 may include W×(H/2) number of pixels positioned at the lower half region in the display device 110.

A plurality of pixels included in the display device 110 may express a bright or dark. For example, each of the plurality of pixels may display (output) bright data or dark data. For another example, each of the plurality of pixels included in the display device 110 may be failed to display (output) the bright data or the dark data.

According to an embodiment, the first region 111 may be used to perform at least one of a low beam function or a function of displaying information on a road surface, other than an advanced driving beam (ADB) function, and the second region 112 may be used to perform the ADB function. For example, since the first region 111 is not a region to perform the ADB function, a safety problem may not be caused. Accordingly, the first region 111 may be allowed to be larger than the second region 112 in the number of a pixel having bright failure or the number of a pixel having dark failure. The pixel having the bright failure may continuously output light, and may not stop the output of the light even when the output of the light has to be stopped. The pixel having the dark failure may not continuously output light, and may not output light even when light has to be output. For another example, when the first region 111 is smaller than the second region 112 in the number of the pixel having the bright failure or the number of the pixel having the dark failure, the functions performed through the first region 111 and the second region 112 may be interchanged.

In the first region 111, the number of the pixel having the bright failure may be allowed up to a first set number. For example, the first set number may be six.

In the first region 111, the number of the pixel having the dark failure may be allowed up to a second set number. For example, the second set number may be six.

In the second region 112, a pixel having the bright pixel is not allowed. In other words, the second region 112 may be not allowed to include a pixel having bright failure.

In the second region 112, the number of a pixel having the dark failure may be allowed up to a third set number. For example, the third set number may be four.

According to an embodiment, when each pixel included in the display device 110 is tilted upward, the pixel may be in an Off-state in which light is not output. When each pixel included in the display device 110 is titled downward, the pixel may be in an On-state in which light is output. In this case, the direction of making light (illumination) incident to the display device 110 may be a lower diagonal direction of the display device 110. For example, when the light is applied in the lower diagonal direction of the display device 110, the pixel, which is tilted upward, of pixels included in the display device 110 may reflect the applied light to a shadow are. Accordingly, the light may not be output. For another example, when the light is applied in the lower diagonal direction of the display device 110, the pixel, which is tilted downward, of the pixels included in the display device 110 may reflect the light to a lens or an output part, such that the light is output. In other words, the display device 110 may determine whether to output light by reflecting the light, based on the gradient of each of pixels included in the display device 110, and the direction of making light incident.

Referring back to FIGS. 1 and 2, the display device 110 may be rotated and mounted, based on the number of failed pixels present in the first region 111 and the second region 112. For example, the display device 110 may be rotated at 180° and mounted, when the pixel having the bright failure is absent in the first region 111, and present in the second region 112 For another example, the display device 110 may be rotated at 180° and mounted, when the pixel having the bright failure is absent in the first region 111, when the number of the pixel having the dark failure is equal to or less than a third set number in the first region 111, when the number of the pixel having the bright failure is equal to or less than a first set number in the second region 112, and when the number of the pixel having the dark failure is equal to or less than a second set number in the second region 112. In other words, the display device 110 may be rotated and mounted, depending on a region of the display device 110, which has a pixel failed in bright data or dark data, such that the first region 111 and the second region 112 may be inverted and mounted. In this case, the first region 111 and the second region 112 may be controlled by the controller 120 to perform mutually different functions.

Figure 3:
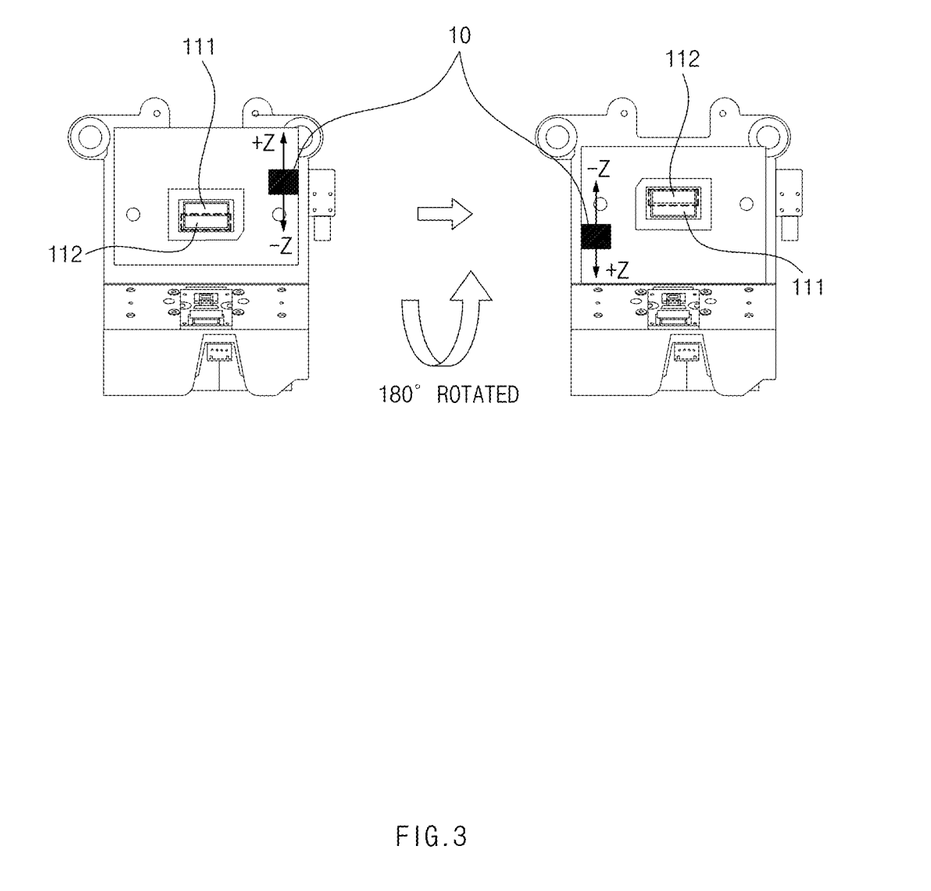
FIG. 3 is a view a display device rotated, according to an embodiment of the present disclosure.

FIG. 3 is a view a display device rotated, according to an embodiment of the present disclosure.

Referring to FIG. 3, the first region 111 and the second region 112 may be rotated at 180°, but the present disclosure is not limited thereto. For example, since the display device 110 may include the first region 111 and the second region 112, the display device 110 may be rotated at 180°.

The first region 111 and the second region 112 may be rotated to operate. For example, when a pixel having the bright failure is absent in the first region and present in the second region 112, the first region 111 and the second region 112 may be rotated at 180° and mounted.

The controller 120 may determine whether the display device 110 including the first region 111 and the second region 112 is rotated. For example, the controller 120 may obtain information on whether a board including the display device 110 is rotated, from a specific sensor. For example, the controller 120 may obtain information on whether the display device 110 is rotated, from an acceleration sensor 10 attached to the board including the display device 110. In this case, the controller 120 may determine whether the display device 110 is rotated, based on the information obtained from the sensor.

According to an embodiment, the controller 120 may obtain information on whether the display device 110 is rotated, from another device inside the vehicle, and may determine whether the display device 110 is rotated, based on the obtained information.

Referring back to FIG. 1, the controller 120 may control the display device 110 based on whether the display device 110 is rotated. For example, the controller 120 may control the second region 112 to perform the ADB function, when determining the display device 110 as not being rotated. For another example, the controller 120 may control the first region 111 to perform the ADB function, when determining the display device 110 as being rotated.

The controller 120 may control coordinates and output data of the display device 110, when determining the display device 110 as being rotated. For example, the controller 120 may set and/or change coordinates and output data of each of the plurality of pixels included in the display device 110, when determining the display device 110 as being rotated.

Figure 4:
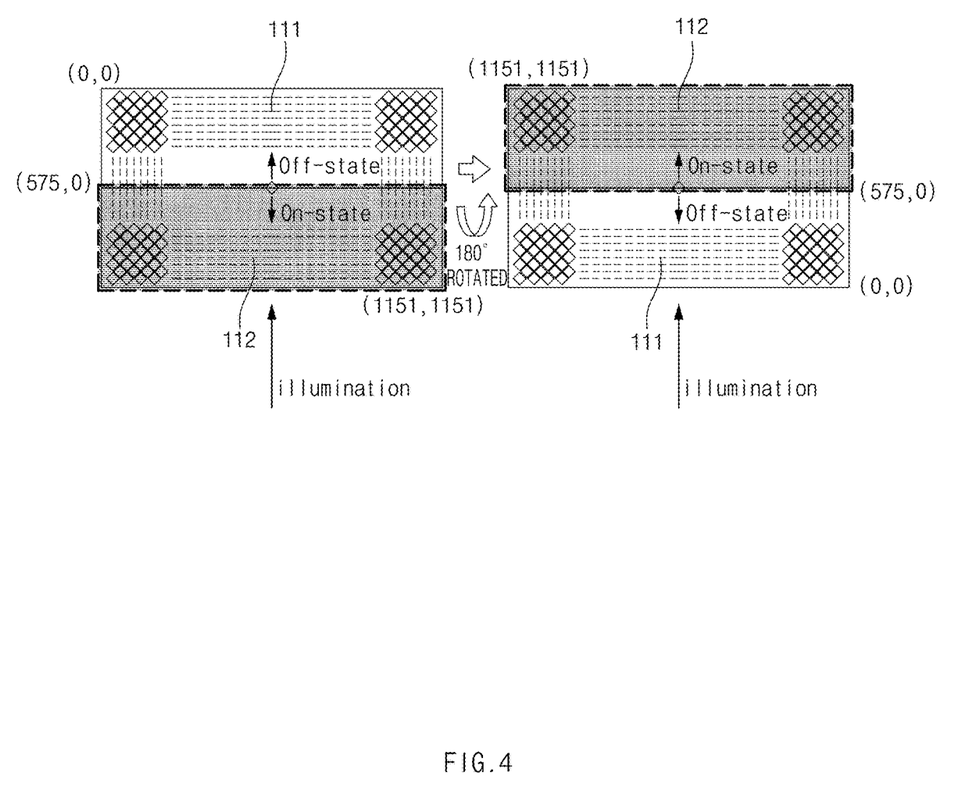
FIG. 4 is a view illustrating that coordinates of a display device are set, according to an embodiment of the present disclosure.

FIG. 4 is a view illustrating that coordinates of a display device are set, according to an embodiment of the present disclosure.

Referring to FIG. 4, the controller 120 may re-set coordinates of a pixel included in the display device 110, when determining the display device 110 as being rotated. For example, the display device 110 may include 1152×1152 pixels having coordinates ranging from (0, 0) to (1151, 1151). In this case, the first region 111 may include 576× 1152 pixels having coordinates ranging from (0, 0) to (575, 1151), and the second region 112 may include 576×1152 pixels having coordinates ranging from (576, 0) to (1151, 1151).

When the display device 110 is rotated, the second region 112 is rotated to a previous position of the first region 111, and the first region 111 is rotated to a previous position of the second region 112. The controller 120 may re-set coordinates of pixels, which are controlled, to coordinates rotated at 180°, as the pixels included in the display device 110 are rotated. For example, when a pixel having coordinates of (0, 0) and included in the first region 111 is rotated at 180°, the pixel is moved to a position of coordinates of (1151, 1151). Accordingly, the controller 120 may re-set coordinates, which are set to (1151, 1151), to (0, 0). For another example, a pixel having coordinates of (x, y) included in the first region 111 or the second region 112 is moved to a position of (1151-x, 1151-y) (x and y are natural numbers equal to or greater than zero and equal to or less than 1151). Accordingly, the controller 120 may re-set coordinates, which are set to (1151-x, 1151-y), to (x, y).

The controller 120 may control the operation of the display device 110, based on the re-set coordinates. For example, the controller 120 may control the operation of each of pixels included in the first region 111 and the second region 112, based on the re-set coordinates.

The controller 120 may control the display device 110 to invert pixel data in black and white and output the pixel data, when determining the display device 110 as being rotated. According to an embodiment, the display device 110 may be the DMD, and the controller 120 may control the display device 110 to invert, in black and white, pixel data of each of the first region 111 and the second region 112 included in the display device 110, and to output the pixel data.

According to an embodiment, on the assumption that the direction (illumination) of making light incident is a lower diagonal direction of the display device 110, the pixel may be in the Off-state, when each pixel included in the first region 111 and the second region 112 is titled upward, and the pixel may be in the On-state when each pixel included in the first region 111 and the second region 112 is titled downward. In this case, when the display device 110 is rotated at 180°, the states of the pixels are changed between the Off-state and the ON-state, depending on directions that pixels included in the display device 110 are titled. Accordingly, the controller 120 may change a manner of controlling each pixel included in the display device 110 depending on whether the display device 110 is rotated.

Figure 5:
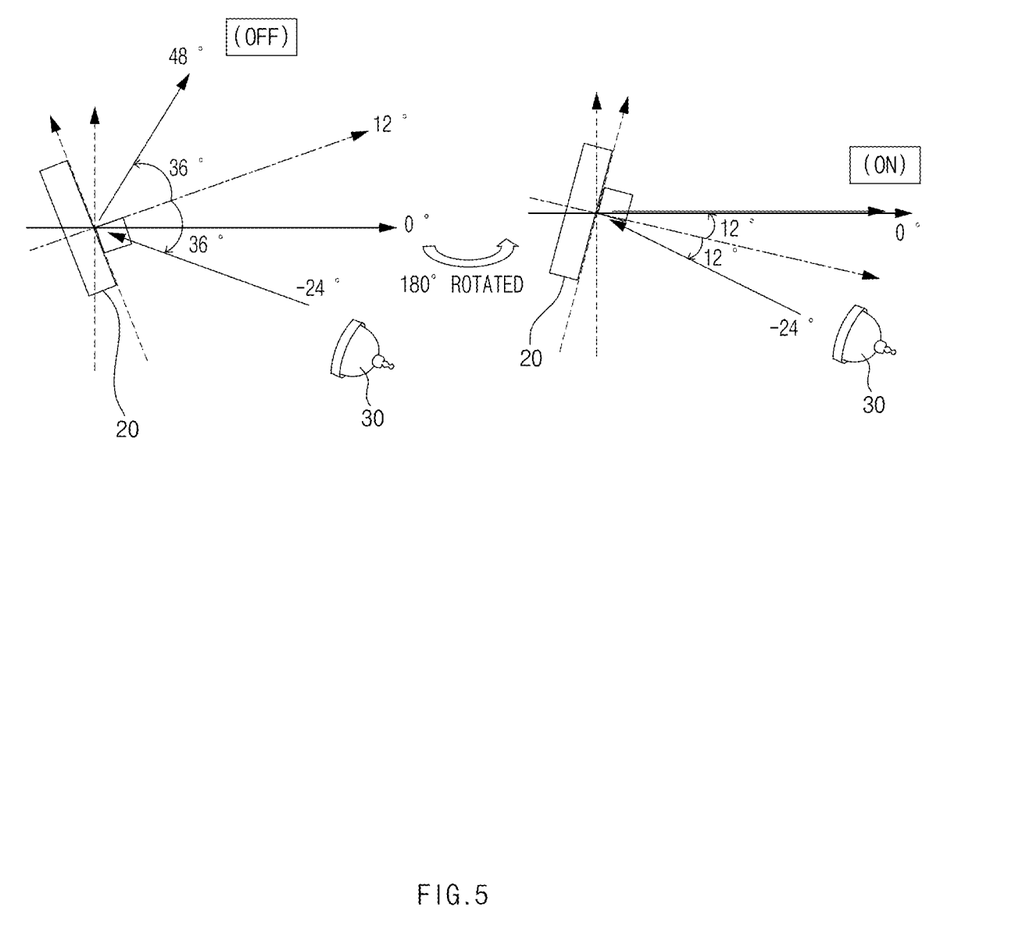
FIGS. 5 and 6 are views illustrating data inversion of a display device, according to an embodiment of the present disclosure.
Figure 6:
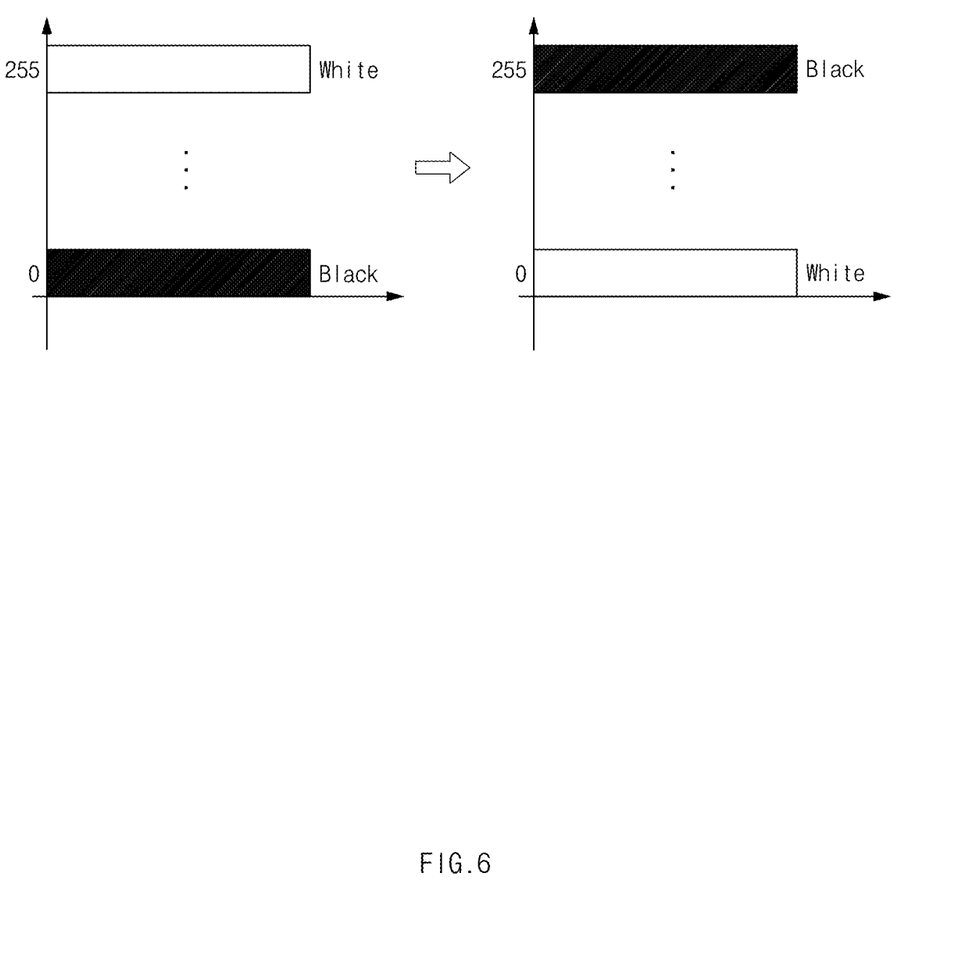

FIGS. 5 and 6 are views illustrating data inversion of a display device, according to an embodiment of the present disclosure.

Referring to FIG. 5, each pixel 20 included in the display device 110 may be changed in angle, and may output data by reflecting light incident from a light source 30. For example, when an angle (reflection angle), at which the light incident from the light source 30 is reflected by the pixel 20, is equal to or greater than a first set angle, the pixel 20 may output dark data. For another example, when the angle, at which the light incident from the light source 30 is reflected by the pixel 20, is less than the first set angle and equal to or greater than a second set angle, the pixel 20 may output bright data. In other words, as the pixel 20 is controlled to be changed in angle, the pixel 20 may change the reflection angle of the light incident from the light source 30, and may output mutually different data depending on the reflection angles of the light.

According to an embodiment, each pixel 20 included in the display device 110 may output back and white data by the light source 30 positioned at −24°. The angle of each pixel 20 included in the display device 110 may be controlled by the controller 120, and the light from the light source 30 may be reflected by the pixel 20 such that the data is output. In this case, when the light incident from the light source 30 is reflected at the angle of 12° or more, the light is included in the shadow area. Accordingly, dark (black) data may be output from the relevant pixel 20. For another example, when the light incident from the light source 30 is reflected at the angle of 12° or less, the relevant pixel 20 may output bright (white) data. According to an embodiment, the controller 120 may adjust an angle of each pixel 20 included in the display device 110 to adjust the reflection angle of light incident from the light source 30 and to control output data of each pixel 20. However, the present disclosure is not limited to the above angle, but the pixel 20 and the light source 30 may have a specific angle. In addition, a range in which black or white data are output may be set to be matched with the angles of the pixel 20 and the light source 30.

When the display device 110 is rotated at 180°, even an angle of each pixel 20 included in the display device 110 may be rotated. For example, when the previous angle of the pixel 20 is titled at 12° with respect to a vertical direction, and when the display device 110 is rotated at 180°, the angle of the rotated pixel 20 may be titled at −12° with respect to the vertical direction. In this case, since the position of the light source 30 is fixed to be maintained at −24°. Accordingly, the pixel 20 may reflect the light, which is emitted from the light source 30, at 0°, and may output bright data.

In this case, the pixel 20 before rotation may output dark data, and the pixel 20 after rotation may output bright data. Accordingly, the controller 120 may control the pixel 20 to invert data in black and white and to output the data, such that the data of the pixel 20 is exactly output. In other words, when determining the display device 110 as being rotated, the controller 120 may control each of pixels 20, which are included in the display device 110, to invert data in black and white and to output the data, such that the display device 110 is controlled to output data the same as that before rotation. However, the present disclosure is not limited to the above angle. For example, the pixel 20 and the light source 30 may have a specific angle. In addition, an angle range in which black or white data are output may be set to be matched with the angles of the pixel 20 and the light source 30.

Referring to FIG. 6, the controller 120 may invert, in black and white, data of a pixel included in the display device 110 and output the data.

According to an embodiment, bright (white) data may have the value of '255' and black (dark) data may have the value of '0'. The controller 120 may control the display device 110 to invert pixel data in black and white and output the pixel data, when determining the display device 110 as being rotated. For example, the controller 120 may identify data of each pixel included in the display device 110. A pixel having the value of '255' may be controlled to output the value of '0', and a pixel having the value of '0' may be controlled to output the value of '255'. For another example, the controller 120 may identify data of each pixel included in the display device 110, may control a pixel having the value of '0' to output white (bright) data, and may control a pixel having the value of '255' to output black (dark) data.

According to an embodiment of the present disclosure, the lamp 100 may include the display device 110 having a first region and a second region mutually different from each other in the number of the pixel having the bright failure and the number of the pixel having the dark failure, and the display device 110 may be rotated and mounted such that the yield rate may be increased in the mass production. Further, in the lamp 100, when the display device 110 is rotated and mounted, the controller 120 may control the display device 110 to operate, identically to an operation of the display device 110 when the display device 110 is not rotated. As the number of failed pixels of the display device 110 is limited, the lamp 100 may consecutively perform the ADB function of the DMD, which is one example of the display device 110, may prevent a driver of another vehicle in front of a host vehicle from being dazzled, and may prevent an accident from occurring due to the dazzling of the driver during driving, by using the ADB function through the DMD.

Figure 7:
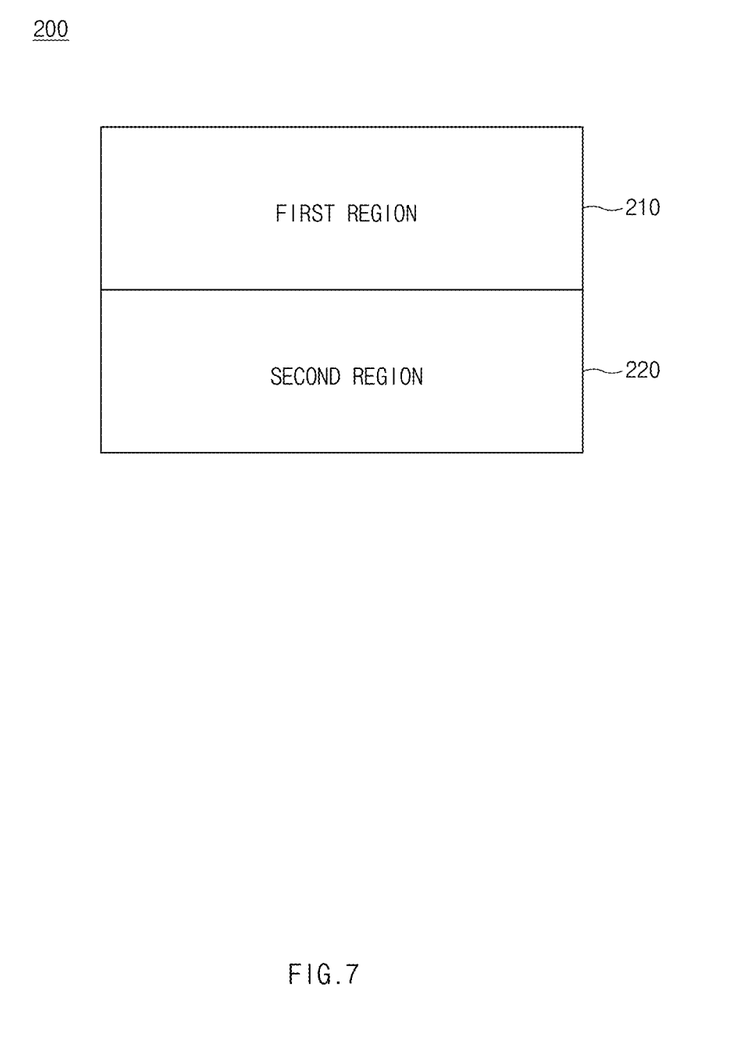
FIG. 7 is a view illustrating a display device, according to an embodiment of the present disclosure.

FIG. 7 is a block diagram illustrating a display device, according to an embodiment of the present disclosure.

Referring to FIG. 7, according to an embodiment of the present disclosure, a display device 200 may include a first region 210 and a second region 220. According to an embodiment, the display device 200 may be substantially identical to the display device 110 of FIG. 1. According to an embodiment, the first region 210 and the second region 220 may be substantially identical to the first region 111 and the second region 112 of FIG. 2.

The display device 200 may include a plurality of pixels. For example, the display device 200 may be a DMD. The display device 200 may generate, in the form of pixel data, operations of a plurality of pixels, and may output the generated pixel data. For another example, the display device 200 may be included in the lamp of the vehicle, and may perform an ADB function, a low beam function, or a function of displaying information on a road surface.

According to an embodiment, the plurality of pixels included in the display device 200 may be individually controlled, and may display mutually different information. For example, each pixel included in the display device 200 may display bright data or dark data. For another example, each pixel included in the display device 200 may have black data or white data, and may output light in front of the display device 200, based on dark data or white data.

According to an embodiment, the display device 200 may reflect the light, which is incident from a light source, by each pixel to output in front of the display device 200. For example, each pixel included in the display device 200 may be controlled by a device having a different angle to change a reflection angle of the light incident from the light source, thereby determining whether the reflected light is output in front of the display device 200.

According to an embodiment, the first region 210 and the second region 220 included in the display device 200 may perform mutually different functions. For example, the first region 210 and the second region 220 may perform at least one of the ADB function, the low beam function, or the function of displaying information on the road surface. For another example, the first region 210 may be used to perform at least one of the low beam function or the function of displaying information on the road surface, and the second region 220 may be used to perform the ADB function. In this case, when the pixel having the bright failure is present, the ADB function may cause dazzling to a driver of another vehicle in front. Accordingly, a region for performing the ADB function is not allowed to include the pixel having the bright failure. In other words, in a normal state, since the second region 220 is used to perform the ADB function, the pixel having the bright failure may not be included in the second region 220. In addition, since the first region 210 is not used to perform the ADB function, the number of the pixel having the bright failure is allowed up to a preset number in the first region 210.

However, the functions of the first region 210 and the second region 220 are not limited thereto. For example, when the pixel having the bright failure is absent in the first region 20, and present in the second region 220, the display device 200 may be rotated such that the first region 210 is to perform the ADB function, which is a previous function for the second region 220, at a previous position of the second region 220, and the second region 220 may perform the low beam function or the function of displaying information on the road surface, which is a previous function for the first region 210, at a previous position of the first region 210.

According to an embodiment of the present disclosure, the first region 210 may be an upper half region of the display device 200, and the second region 220 may be a lower half region of the display device 200. For example, the first region 210 may be equal to the second region 220 in size. In other words, the sizes of the first region 210 and the second region 220 may have exact halves of the size of the display device 200. In this case, since the first region 210 and the second region 220 have equal sizes, when it is determined that the ADB function is unable to be performed through the second region 220, but able to be performed through the first region 210, the display device 200 may be rotated at 180° and used. For example, when the pixel having the bright failure is absent in the first region 210, but present in the second region 220, the first region 210 may be used to perform the ADB function, and the second region 220 may be used to perform at least one of the low beam function or the function of displaying the information on the road surface.

In the first region 210, the number of the pixel having the bright failure may be allowed up to the first set number and the number of the pixel having the dark failure may be allowed up to the second set number. For example, the first set number may be six, and the second set number may be six. However, the first set number and the second set number are not limited to the above numbers.

In the second region 220, the pixel having the bright failure may not be allowed, but the number of the pixel having the dark failure may be allowed to the third set number. For example, the first set number may be four. However, the third set number is not limited to the above number.

Figure 8:
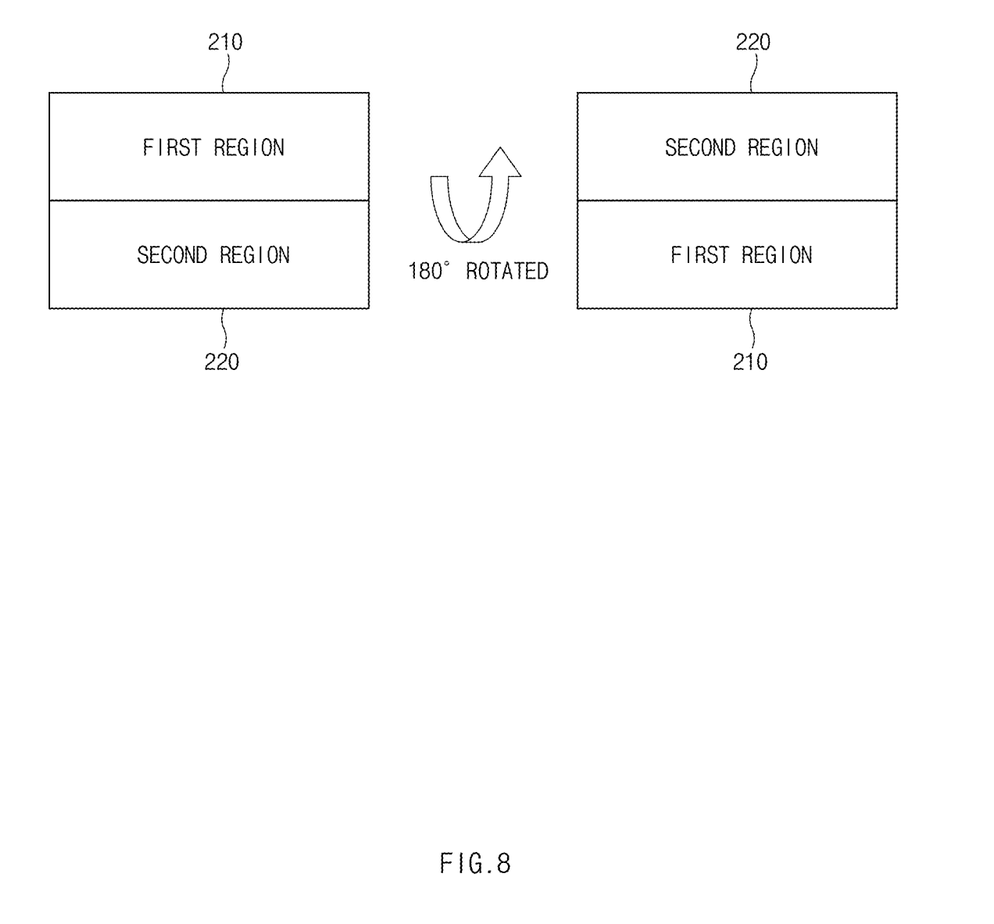
FIG. 8 is a view a display device rotated, according to an embodiment of the present disclosure.

FIG. 8 is a view a display device rotated, according to an embodiment of the present disclosure.

According to an embodiment, the display device 200 may be rotated at 180° and used. For example, when the functions of the first region 210 and the second region 220 need to be interchanged to each other, the display device 200 may be rotated at 180° and used. In other words, when the first region 210 is positioned on the second region 220 at a previous stage, the display device 200 may be rotated at 180° to position the first region 210 to be under the second region 220.

When the display device 200 is rotated at 180° and used, the coordinates of each pixel included in the display device 200 may be re-set. For example, when the display device 200 is rotated, since the positions of the first region 210 and the second region 220 may be interchanged, even positions of pixels included in the first region 210 and the second region 220 may be interchanged. In this case, the coordinates of each of the pixels included in the first region 210 and the second region 220 needs to be re-set, such that the display device 200 normally operates. A manner of re-setting the coordinates of each of the pixels included in the first region 210 and the second region 220 may be substantially identical to a manner of re-setting the coordinates of each of pixels included in the first region 111 and the second region 112 of FIG. 6.

When the display device 200 is rotated at 180° and used, data of each pixel included in the display device 200 may be inverted in black and white and output. For example, when the display device 200 is rotated, even each pixel included in the display device 200 may be rotated. In this case, when the data of the pixel included in the display device 200 is output without change, a result inverted in black and white may be output. In other words, when the data of the pixel included in the display device 200 is inverted in black and white and output, a result, which is the same as that of the data of each pixel before the display device 200 is rotated, may be output.

According to an embodiment of the present disclosure, the lamp may include the display device having mutually different references for the number of a failed pixel, depending on regions, and may provide the ADB function by controlling the display device, based on whether the display device is rotated.

According to an embodiment of the present disclosure, in the lamp, the display device may be rotated and mounted based on the number of failed pixels included in the display device, and the controller may control the display device to perform different functions depending on regions, when the display device is rotated and mounted.

According to an embodiment of the present disclosure, the display device may have mutually different references for the number of a failed pixel, depending on regions, and may determine whether to rotate, based on the number of failed pixels in each region, such that the display device is bi-directionally used. Accordingly, the yield rate may be increased in the mass production.

Besides, a variety of effects directly or indirectly understood through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A lamp comprising:
a display device comprising a number of pixels, the display device comprising a first region comprising a first subset of the number of pixels and a second region comprising a second subset of the number of pixels, the first region having a first reference for an acceptable number of failed pixels in the first region based on a first lamp function performed by the first region, the second region having a second reference for an acceptable number of failed pixels in the second region based on a second lamp function performed by the second region, the second lamp function being mutually different from the first lamp function,
wherein the first reference is different than the second reference; and
a controller configured to interchange functionality of the first region and the second region by controlling control the first region to perform the second lamp function and the second region to perform the first lamp function based on at least one of a comparison of a first number of failed pixels to the first reference, or a comparison of a second number of failed pixels to the second reference.

2. The lamp of claim 1, wherein:
the number of pixels having bright failure is allowed up to a first set number in the first region and the number of pixels having dark failure is allowed up to a second set number in the first region, and
the pixels having the bright failure are not allowed in the second region, and the number of pixels having the dark failure is allowed up to a third set number in the second region.

3. The lamp of claim 2, wherein the first set number is six, the second set number is six, and the third set number is four.

4. The lamp of claim 1, wherein:
the first region is an upper half region of the display device, and
the second region is a lower half region of the display device.

5. The lamp of claim 2, wherein the display device is rotated 180° and mounted when the pixel having the bright failure is absent in the first region, but present in the second region.

6. The lamp of claim 5, wherein the controller is configured to:
determine whether the display device is rotated; and
control the display device based on whether the display device is rotated.

7. The lamp of claim 6, wherein the controller is configured to:
re-set coordinates of a pixel included in the display device when it is determined that the display device is rotated.

8. The lamp of claim 6, wherein the controller is configured to:
control the display device to invert pixel data of the display device and to output the pixel data when it is determined that the display device is rotated.

9. The lamp of claim 6, wherein the controller is configured to:
control the second region to be used to perform an adaptive driving beam (ADB) function when it is determined that the display device is not rotated; and
control the first region to be used to perform the ADB function when it is determined that the display device is rotated.

10. The lamp of claim 1, wherein:
the first region is used to perform at least one of a low beam function or a function of displaying information on a road surface; and
wherein the second region is used to perform an ADB function, and a pixel having bright failure is not allowed in the second region.

11. A display device comprising:
a first region comprising a first subset of a number of pixels of the display device, in which a number of pixels in the first region having bright failure is allowed up to a first set number, and a number of pixels in the first region having dark failure is allowed up to a second set number based on a first lamp function performed by the first region;
a second region comprising a second subset of the number of pixels of the display device, in which the pixels in the second region having the bright failure are not allowed and a number of pixels in the second region having the dark failure is allowed up to a third set number based on a second lamp function performed by the second region, the second lamp function being mutually different from the first lamp function; and
a connection to a controller, the first region and second region are configured to be controlled to interchange functionality of the first region and the second region by the first region being controlled to perform the second lamp function and the second region being controlled to perform the first lamp function based on a comparison of pixels having bright failure or dark failure to at least one of the first set number, the second set number or the third set number.

12. The display device of claim 11, wherein the first region is an upper half region of the display device, and the second region is a lower half region of the display device.

13. The display device of claim 11, wherein:
the second region is used to perform an ADB function, and
the first region is used to perform at least one of a low beam function or a function of displaying information on a road surface.

14. The display device of claim 11, wherein the first set number is six, the second set number is six, and the third set number is four.

15. The display device of claim 11, wherein:
the first region is used to perform an ADB function; and
the second region is used to perform at least one of a low beam function or a function of displaying information on a road surface, when the pixel having the bright failure is absent in the first region, but present in the second region.

16. The display device of claim 15, wherein the display device is rotated 180°.

17. The display device of claim 16, wherein coordinates of each pixel is re-set.

18. The display device of claim 16, wherein data of each pixel is inverted in black and white and output.

* * * * *